Sept. 2, 1952  W. S. FULD  2,609,023

CUTTER FOR ONIONS AND THE LIKE

Filed March 27, 1951

INVENTOR
*Walter S. Fuld*
BY
*William F. Nickel*
ATTORNEY

Patented Sept. 2, 1952

2,609,023

UNITED STATES PATENT OFFICE 2,609,023

CUTTER FOR ONIONS AND THE LIKE

Walter Sidney Fuld, New York, N. Y.

Application March 27, 1951, Serial No. 217,764

3 Claims. (Cl. 146—171)

My invention is an improved slicing and cutting implement; particularly a cutting and slicing implement for culinary use in preparing fruits and vegetables to be served and eaten.

An important object of this invention is to provide a slicing and cutting device or implement by means of which vegetables and fruits can be readily incised in two directions with one operation, and thus quickly divided into small pieces. To this end the implement comprises a set of fixed parallel cutting blades having edges with sections that can be forced straight into an onion or cucumber, for example, to mark the portions that are to be separated, and sections set at an angle to the blades to sever said portions. The final result is gained by a single movement of the fruit or vegetable along said blades, and only one set of specially shaped blades is required.

The nature of the invention is clearly described herein and the novel features are defined in the appended claims. On the drawings, a preferred embodiment of the invention is illustrated, but changes may be made in minor respects without alteration or omission of any of the essential characteristics of the improvement.

Figure 1:
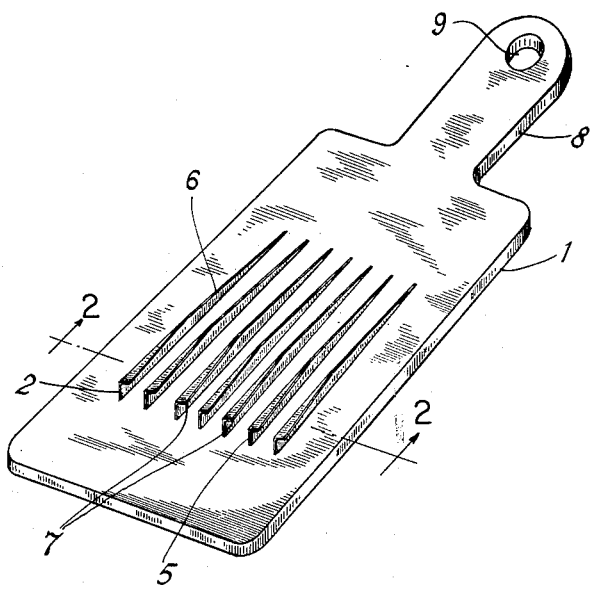
Figure 1 is a perspective view of a cutter and slicer according to my invention.
Figure 2:
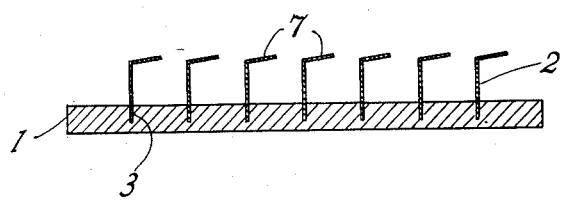
Figure 2 is a cross section on line 2—2 of Figure 1.
Figure 3:
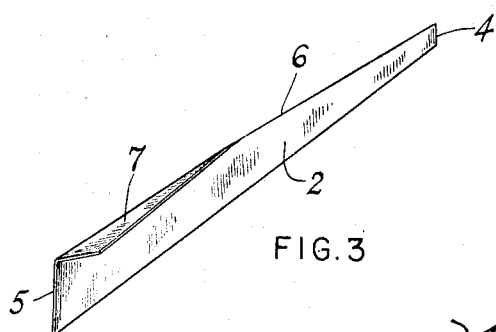
Figure 3 is a perspective view of one of the blades showing the form thereof.

The implement comprises a body or member 1 in the form of a flat board, with a set of parallel blades 2 affixed to one face thereof. The blades are each mounted by inserting the lower edge which is straight, into slots 3 in the board 1, and the blades are firmly held by making the blades and slots of such width and thickness that the blades fit tightly. The blades 2 are preferably of metal, but can be of plastic or other suitable material.

One end 4 of each blade is narrower than the opposite end 5. The ends 4 are about as wide as the depth of the slots 3; and when the blades are in place, the exposed edges each present a section of length 6 that slopes down from a point between the two ends to the ends 4 in the board 1. Between said point and the opposite end 5 the blades along the exposed edges are bent over all in the same direction, to present triangular sections 7 that are substantially parallel or nearly so to the face of the board 1. The outer edges of each section 7 are diagonal with respect to the length of the blades, and at the point of greatest width each section 7 is very close to an adjacent blade on one side of it. The width of the blades is preferably perpendicular to the face of the board 1.

In use, the operator holds an onion, for instance, suitably peeled, against the sloping parts or sections 6 of the exposed edges of the blades, and presses the onion so that the blades cut into it. At the same time the onion is drawn along the blades towards the bent over sections 7. The sections 6 of the edges make parallel incisions, between which the blades mark off portions in the form of strips, and when the onion reaches the sections 7, incisions are made between the first incisions, but substantially in a plane parallel to the board, and portions of the onion between the blades are then cut free in the form of separate pieces. The entire onion can be cut up by repeated use of the implement in the same way.

The device is thus simple and easy to produce and operate and can be utilized to cut and slice other vegetables and fruits such as apples, cucumbers, potatoes, etc. At one end of the board is an extension 8 with a hole 9, so that the device can be readily hung up on a stud or hook.

Having described my invention, what I believe to be new is:

1. A cutter and slicer comprising a flat member having blades secured on one face thereof, the blades extending along said members and being parallel to one another, the width of the blades projecting outward from said face, said blades each having a section of its outer edge inclined to said face and being bent over along the remainder of their outer edges to present triangular portions extending sidewise in the same direction approximately parallel to said face.

2. A cutter and slicer comprising a flat member having blades secured on one face thereof, the blades extending along said member and being parallel to one another, the width of the blades projecting outward from said face, said blades each having a section of its outer edge inclined to said face and being bent over along the remainder of their outer edges to present triangular portions extending sidewise in the same direction approximately parallel to said face, said member having parallel slots in which the opposite edges of the blades are firmly mounted.

3. A cutter and slicer comprising a flat member having parallel slots therein, blades each having one edge inserted in one of said slots and tightly held therein, each blade having a narrow end approximately as wide as the depth of the slot receiving it, and being wider at the opposite end, the blades projecting from said slots except at said narrow end, each blade having a section of its outer edge inclined from an intermediate point to said narrow end; and having a triangular section along its edge between said point and the wider end, said triangular sections all being bent over in the same direction into approximate parallelism to said member.

WALTER SIDNEY FULD.

REFERENCES CITED

The following references are of record in the file of this patent:

UNITED STATES PATENTS

| Number | Name | Date |
|---|---|---|
| 1,061,867 | Plager | May 13, 1913 |
| 1,738,148 | Opitz | Dec. 3, 1929 |
| 1,809,824 | Bader | June 16, 1931 |
| 2,227,364 | Potstada | Dec. 31, 1940 |